(12) United States Patent
Fattorusso et al.

(10) Patent No.: US 7,472,929 B2
(45) Date of Patent: Jan. 6, 2009

(54) CONNECTOR

(75) Inventors: Antonio Fattorusso, Leinfelden-Echterdingen (DE); Jürgen Häberlein, Murrhardt (DE)

(73) Assignee: Andreas Stihl AG & Co. KG (DE)

( * ) Notice: Subject to any disclaimer, the term of this patent is extended or adjusted under 35 U.S.C. 154(b) by 184 days.

(21) Appl. No.: 11/247,453

(22) Filed: Oct. 11, 2005

(65) Prior Publication Data

US 2006/0087115 A1 Apr. 27, 2006

(30) Foreign Application Priority Data

Oct. 22, 2004 (DE) .................. 20 2004 016 374 U

(51) Int. Cl.
*F16L 33/00* (2006.01)
(52) U.S. Cl. .................. 285/239; 285/124.4; 285/140.1
(58) Field of Classification Search .................. 285/239, 285/124.4, 124.3, 124.2, 131.1, 242, 140.1
See application file for complete search history.

(56) References Cited

U.S. PATENT DOCUMENTS

| 531,578 | A | * | 12/1894 | Van Dyke .................... 285/239 |
| 3,469,863 | A | * | 9/1969 | Riester et al. ............. 285/124.4 |
| 3,512,806 | A | * | 5/1970 | Fullmer et al. ............ 285/124.4 |
| 3,767,233 | A | * | 10/1973 | Hodge ........................ 285/239 |
| 3,944,261 | A | * | 3/1976 | Reed et al. ................. 285/21.2 |
| 4,243,254 | A | * | 1/1981 | Hill et al. ..................... 285/242 |
| 4,603,890 | A | * | 8/1986 | Huppee ....................... 285/239 |
| 4,744,785 | A | * | 5/1988 | Rosenthal et al. .......... 604/6.09 |
| 4,815,769 | A | * | 3/1989 | Hopperdietzel .......... 285/131.1 |
| 5,033,777 | A | | 7/1991 | Blenkush |
| 6,003,904 | A | * | 12/1999 | Frohlich et al. .......... 285/124.1 |
| 6,308,992 | B1 | * | 10/2001 | Mitsui et al. ................ 285/239 |
| 6,692,037 | B1 | * | 2/2004 | Lin .......................... 285/124.1 |
| 2004/0011396 | A1 | | 1/2004 | Fattorusso et al. |

FOREIGN PATENT DOCUMENTS

| DE | 3817442 A1 | * | 11/1989 |
| DE | 4438295 | | 7/1996 |
| EP | 0279925 | | 8/1988 |
| FR | 2652872 A1 | * | 4/1991 |
| WO | 94/18486 | * | 8/1994 |

* cited by examiner

*Primary Examiner*—David E Bochna
(74) *Attorney, Agent, or Firm*—Robert W. Becker; Robert W. Becker & Assoc.

(57) ABSTRACT

A connector for the connection of hoses, comprising a first connection stub having a first free end for receiving a first hose, and a second connection stub for receiving a second hose. The first hose has an inner diameter that is smaller than the inner diameter of the second hose, and the second connection stub is provided with a shoulder that, in a direction toward the second free end, decreases from a first outer diameter to a second outer diameter, with the first outer diameter being larger than the inner diameter of the first hose. The second outer diameter can be smaller or the same as the inner diameter of the first hose.

7 Claims, 3 Drawing Sheets

CONNECTOR

The instant application should be granted the priority date of Oct. 22, 2004, the filing date of the corresponding German patent application 20 2004 016 374.8.

BACKGROUND OF THE INVENTION

The present invention relates to a connector for the connection of hoses.

A connector system for the connection of hoses having different inner diameters is known from US 2004/001396 A1. To avoid the larger hose from being mounted onto the smaller connection, it is known from this document to dispose an outer diameter limiter on the smaller connection element. However, with elastic hoses having similar diameters, it is possible, despite the outer diameter limiter, to press the larger hose onto the smaller connection element and into the outer diameter limiter.

It is therefore an object of the present invention to provide a connector that in an easy manner reliably avoids mounting of the hoses onto the wrong connectors, i.e. a mistaken interchange of the hoses during mounting on the connector is prevented.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
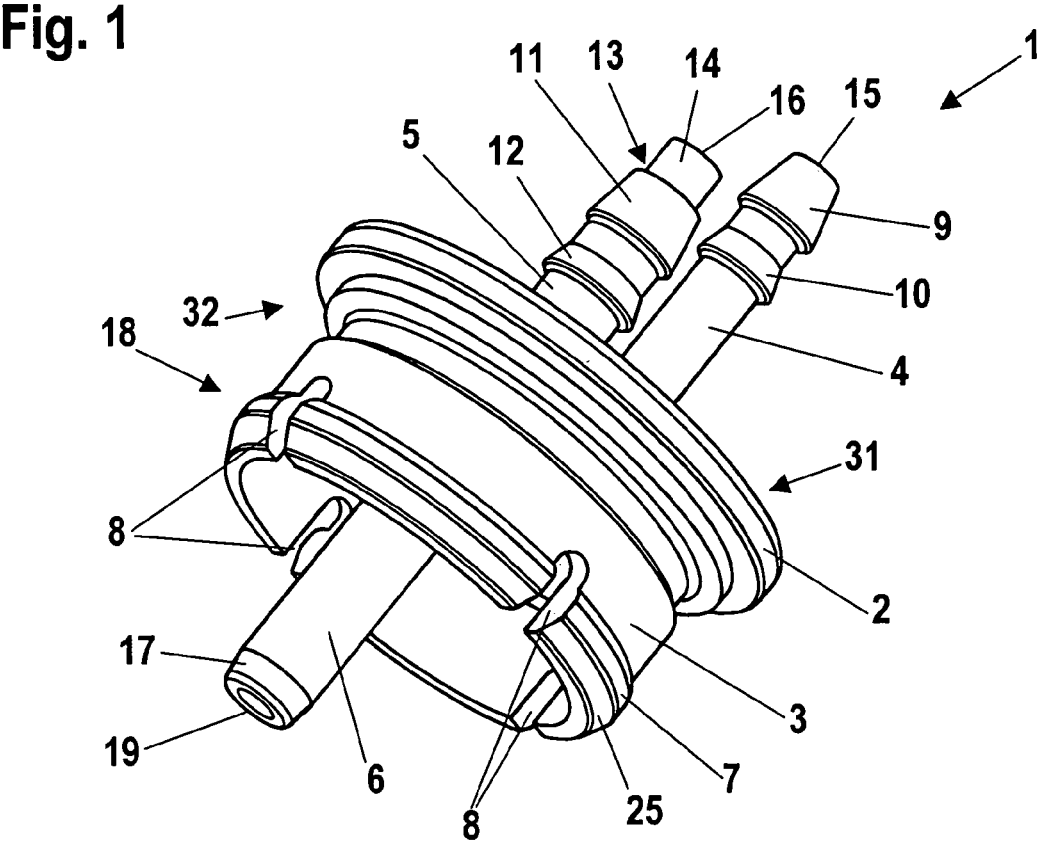
FIG. 1 is a perspective view of one exemplary embodiment of the connector of the present application.

The connector of the present application comprises a first connection stub having a first free end for receiving a first hose, and a second connection stub having a second free end for receiving a second hose, wherein the first hose has an inner diameter that is smaller than the inner diameter of the second hose, wherein the second connection stub is provided with a shoulder that, in a direction toward the second free end, decreases from a first outer diameter to a second outer diameter, and wherein the first outer diameter is larger than the inner diameter of the first hose.

The shoulder formed on the second, larger connection stub permits the hose to be pressed on from the free end up to the shoulder. In the event of an erroneous mounting, the hose having the smaller inner diameter abuts against the shoulder. The hose having the smaller inner diameter can be pushed over the shoulder only with great difficulty, so that the operator will recognize the erroneous mounting, and will press the hose having the smaller inner diameter onto the other, smaller connection stub. This prevents an erroneous mounting in a straightforward manner. The shoulder can be produced in a simple manner, and can also be added later to existing constructions without further structural alterations being necessary.

The second outer diameter is advantageously smaller or approximately the same as the inner diameter of the first hose, so that the first hose can easily be pressed up to the shoulder. The first outer diameter is advantageously smaller than the inner diameter of the second hose, so that the second, larger hose can be pressed over the shoulder onto the connection stub. The outer diameter of the first connection stub is advantageously greater than or the same as the second outer diameter, and smaller than the first outer diameter. The shoulder is advantageously formed by a wall that extends approximately perpendicular to the longitudinal central axis of the second connection stub. This ensures that the first hose cannot be pressed over the shoulder; rather, the first hose will rest against the wall that forms the shoulder. A bevel is formed on the second connection stub on that side of the shoulder facing away from the free end. The second, larger hose can thus be pressed over the shoulder onto the bevel, and is widened by the bevel to such an extent that it can easily be pressed onto the second connection stub. Since the inner diameter is smaller than the second outer diameter, the first hose cannot be pressed onto the bevel, where it could otherwise be widened.

A cylindrical portion is advantageously formed on the second connection stub between the shoulder and the free end. A hose that has been pressed onto the second connection stub is guided on the cylindrical portion. It is thus possible to ensure that during the mounting of the smaller, first hose onto the second connection stub, the hose cannot be placed at such an angle that it could be forced over the shoulder. The cylindrical portion advantageously extends over a portion of the length of the second connection stub, in particular over ¼ to ¹⁄₁₀ of the length of the second connection stub. A cylindrical portion that is short in comparison to the overall length of the second connection stub is adequate for a guidance of the hose that is mounted on the second connection stub. With a relatively short overall length of the second connection stub, a cylindrical portion only slightly adversely affects the fixation of the hose that is mounted on the second connection stub.

The connector has a base plate on which is disposed a mounting element for mounting the connector in a opening. The connector can thus be fixed in position on a housing, such as a tank or the like. For easy mounting, the mounting element has an engagement element. In order to achieve an adequate fixation of the hoses on the connection stubs, at least one connection stub has a conical portion, whereby the diameter in the conical portion decreases in a direction toward the free end of the connection stub. The conical portion forms an annular raised portion that in the direction from the free end toward the base plate has a slight inclination relative to the longitudinal central axis of a connection stub, and in the opposite direction is steeply inclined relative to the longitudinal central axis of the connection stub. As a result, the hose can be easily pressed onto the connection stub from the free end, while a pulling-off, and in particular an unintentional detachment, of the hose from the connection stub is made difficult by the conical portion. The connector is expediently a monolithic component, with the connector in particular being made of polymeric material. In this way, the connector can be easily manufactured and can have a low weight.

Further specific features of the present application will be described in detail subsequently.

DESCRIPTION OF SPECIFIC EMBODIMENTS

Referring now to the drawings in detail, the connector 1 shown in FIG. 1 comprises a base plate 2, on the underside or back side 32 of which is disposed an annular mounting element 3. An engagement element 18 is formed on the mounting element 3. The engagement element 18 includes a peripheral bead 7 on the mounting element 3, as well as four slots 8 that extend perpendicular to the base plate 2 of the connector 1 over a portion of the length of the mounting element 3, and which extend through the bead 7. Disposed on the back side 32 of the base plate 2, in the interior of the mounting element 3, is a third connection stub 6, which extends perpendicular to the plane formed by the base plate 2. Disposed on the free end 19 of the third connection stub 6 that faces away from the base plate 2 is a bevel 17 on the third connection stub 6. A hose or tube can be pressed onto the third connection stub 6 from the direction of the free end 19. The connector 1 is a monolithic component, and is made of polymeric material.

Figure 2:
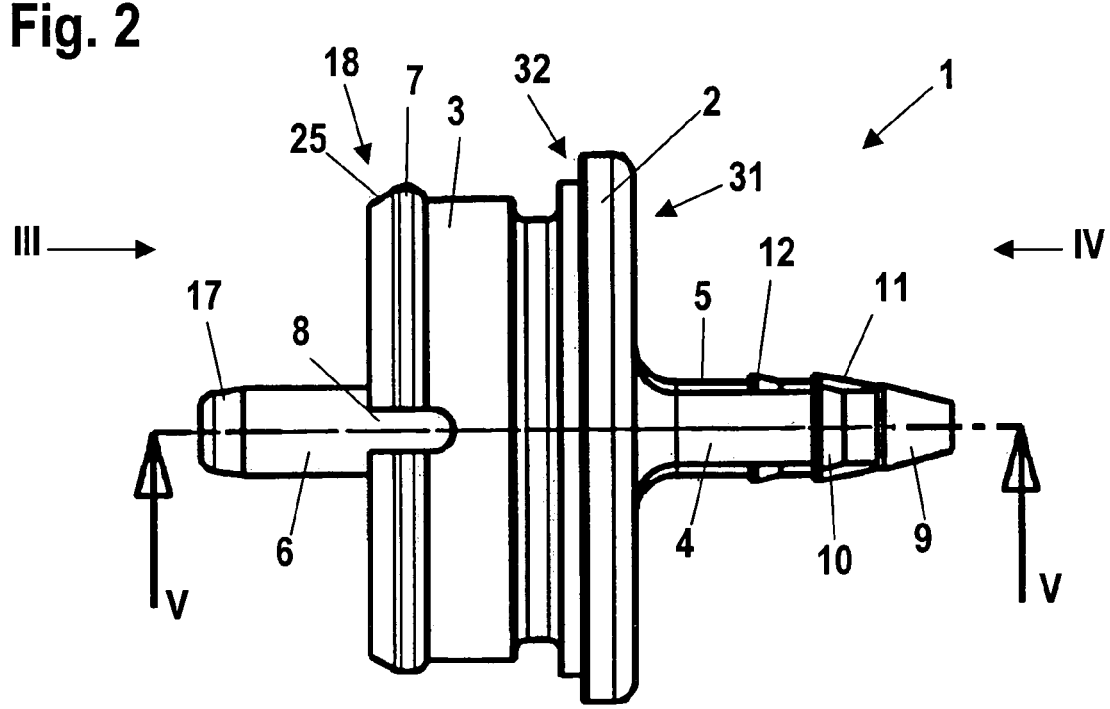
FIG. 2 is a side view of the connector of FIG. 1.

A first connection stub 4 and a second connection stub 5 are disposed on the upper or front side 31 of the base plate 2 opposite from the back side 32. As can also be seen in FIG. 2, the outer diameter of the first connection stub 4 is smaller than the outer diameter of the second connection stub 5. The first connection stub 4 is suitable for the connection of a first hose or tube, and the second connection stub 5 is suitable for the connection of a second hose or tube. Further connection stubs can also be provided for the connection of further hoses or tubes. The inner diameter of the first hose is smaller than the inner diameter of the second hose. At its free end 15, which faces away from the base plate 2, the first connection stub 4 has a bevel 9. Disposed on the first connection stub 4 between the bevel 9 and the base plate 2 of the connector 1, adjacent to the bevel 9, is a conical portion 10. As also shown in FIG. 2, the diameter of the conical portion 10 increases from the free end 15 in a direction toward the base plate 2. The second connection stub 5, at its free end 16, which faces away from the base plate 2, has a cylindrical portion 14, followed by a shoulder 13 and a bevel 11. Between the bevel 11 and the base plate 2, the second connection stub 5 has a conical portion 12, the diameter of which continuously increases from that side that faces the free end 16 to that side that faces the base plate 2. The purpose of the conical portions 10 and 12 is that a hose can be pressed onto the connection stubs 4,5 from the free ends 15 and 16 respectively, and in the opposite direction will be held by that side of the conical portions 10, 12 that face away from the free ends 15, 16.

Figure 3:
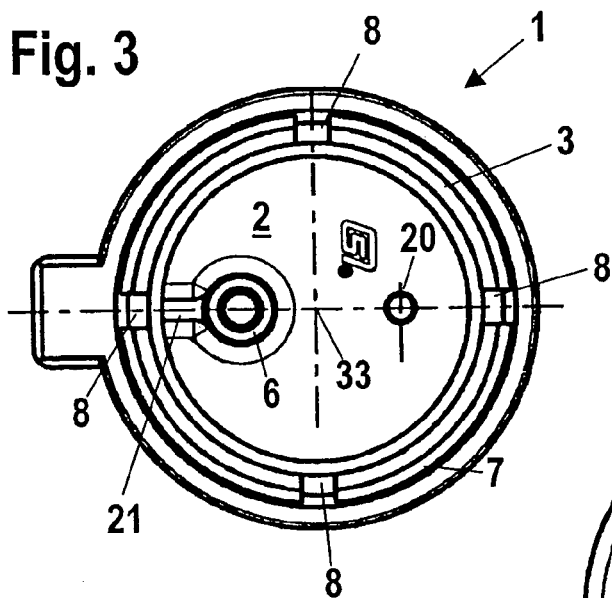
FIG. 3 is a view of the connector taken in the direction of the arrow III in FIG. 2.

As shown by the view onto the back side 32 of the base plate in FIG. 3, four slots 8 are provided in the mounting element 3. The slots 8 are symmetrically disposed about the longitudinal central axis 33 of the mounting element 3 at a respective spacing of 90° relative to one another. Disposed between the mounting element 3 and the third connection stub 6 is a reinforcing rib 21 that increases the stability of the third connection stub. A bore 20 is provided at the base plate 2.

Figure 4:
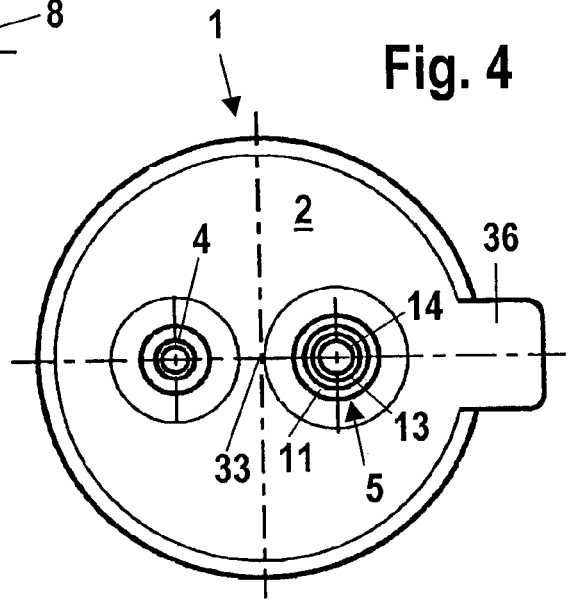
FIG. 4 is a view of the connector taken in the direction of the arrow IV in FIG. 2.

FIG. 4 shows a plan view onto the upper or front side of the connector 1. The base plate 2 is circular, and is symmetrical to the longitudinal central axis 33 of the mounting element 3; a tab 36 is formed on one side of the base plate 2.

Figure 5:
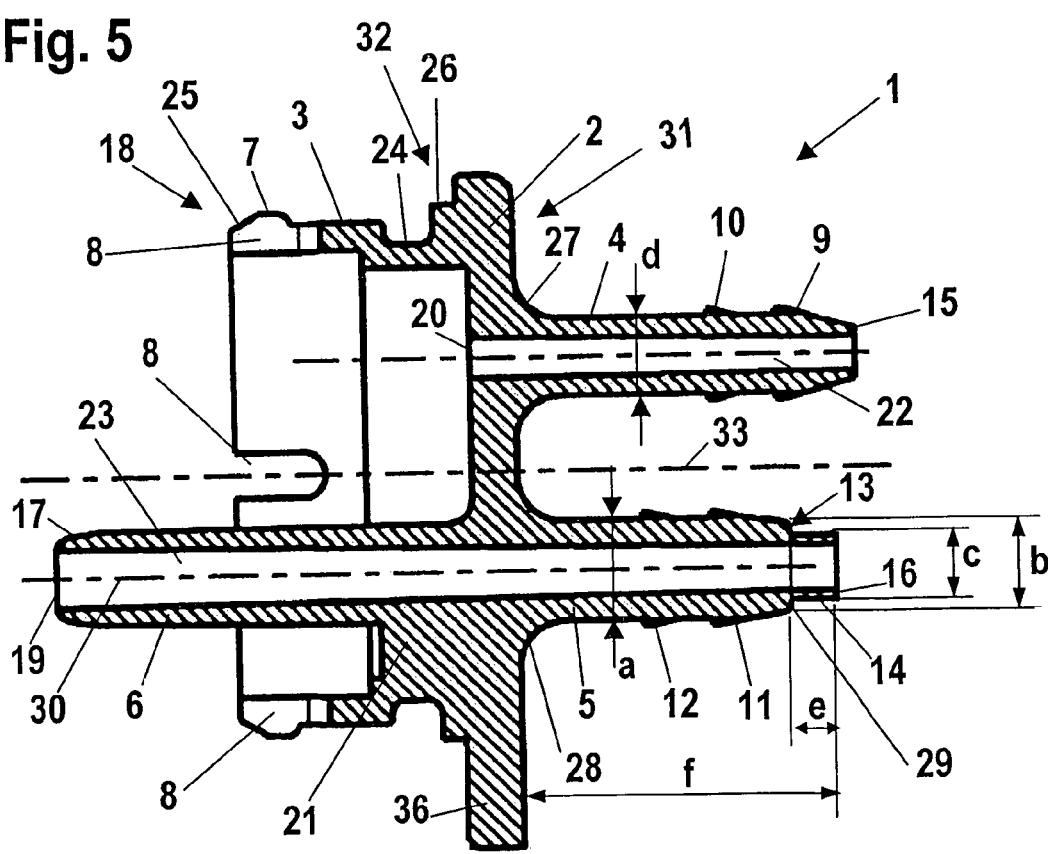
FIGS. 5-7 are cross-sectional views of the connector taken along the line V-V in FIG. 2.

As shown in the cross-sectional view of FIG. 5, the back side 32 of the base plate 2 is provided with an annular shoulder 26 by means of which the connector 1 can be disposed in a bore or hole. To enable a simple mounting of the connector 1 in a bore, the outer periphery of the mounting element 3, on that side facing away from the base plate 2, is provided with a bevel 25 adjacent to the bead 7. Formed on that side of the shoulder 26 that faces away from the base plate 2 is a groove 24 into which can be disposed a sealing means, for example an O-ring, so that the connector 1 can be sealingly disposed in a bore. By means of the engagement element 18, the connector 1 is fixed in the bore. The first connection stub 4 has an outer diameter d that is smaller than the outer diameter a of the second connection stub 5. Formed in the interior of the first connection stub 4 is a channel 22 that opens on the back side 32 of the base plate 2 at the bore 20. The first connection stub 4 merges into the base plate 2 via a rounded portion 27. At the free end 15, the first connection stub 4 has an outer diameter that is smaller than the outer diameter d, so that a hose that is to be placed onto the first connection stub 4 can be pressed onto the bevel 9 that adjoins the free end 15 and is widened by the bevel 9. Due to the elasticity of the hose, a fixed seating of the hose on the connection stubs 4,5 can be achieved if the inner diameter of the hose is slightly smaller than the outer diameter of the pertaining connection stub. It is then necessary to widen the hose for the mounting.

The second connection stub 5 and the third connection stub 6 are coaxial to one another. A common channel 23 that passes through the base plate 2 is formed in the second connection stub 5 and the third connection stub 6. The second connection stub 5 merges into the base plate 2 via a rounded portion 28. In the direction of its longitudinal central axis 30, the second connection stub 5 has a length f that is a multiple of the length e of the cylindrical portion 14 as measured in the direction of the longitudinal central axis 30. The length e of the cylindrical portion 14 is advantageously ¼ to ¹/₁₀ of the length f of the second connection stub 5. The outer diameter c of the cylindrical portion 14 that is disposed at the free end 16 is smaller than the first outer diameter b of the second connection stub 5. In this connection, the first outer diameter b is the larger diameter at the shoulder 13, and the second outer diameter c is the smaller diameter at the shoulder 13. The bevel 11 adjoins the shoulder 13. The first outer diameter b is smaller than the outer diameter a of the second connection stub 5, so that a hose that is to be placed onto the connection stub 5 can easily be pressed onto the bevel 11. The shoulder 13 is formed by a wall 29 that extends from the cylindrical portion 14, perpendicular to the longitudinal central axis 30 of the second connection stub 5, to the bevel 11.

Figure 6:
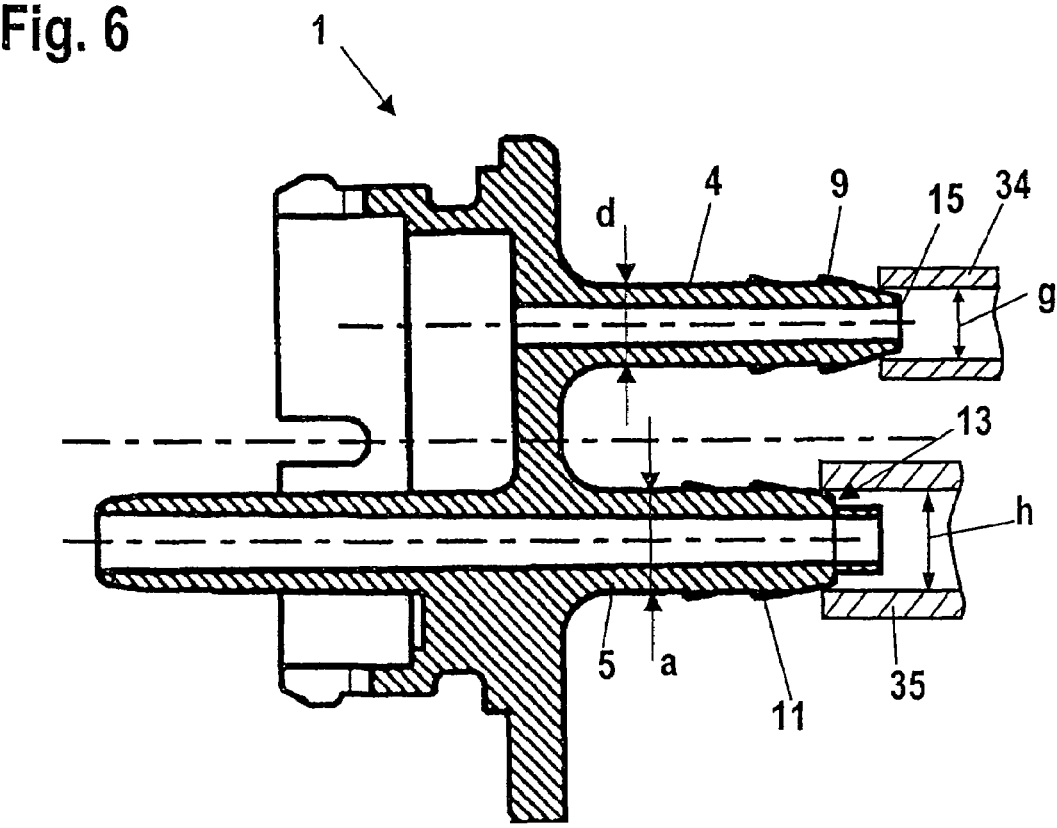
Figure 7:
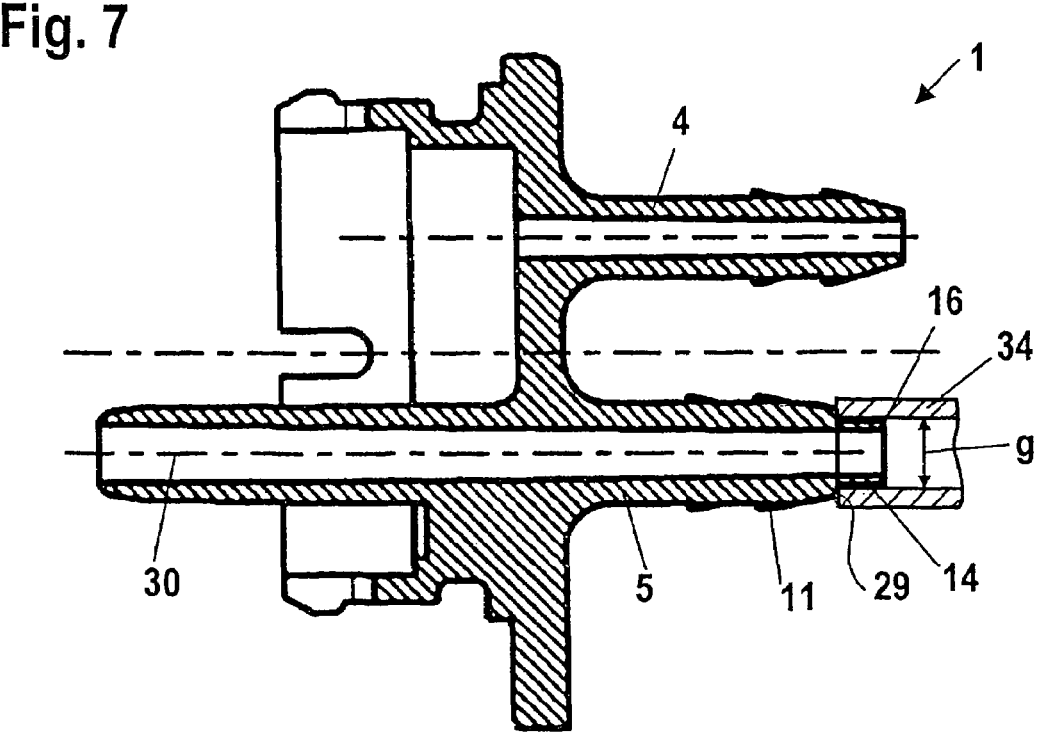

FIGS. 6 and 7 show the placement of hoses onto the connector 1. In FIG. 6, a first hose 34 having an inner diameter g is shown on the first connection stub 4. The inner diameter g advantageously corresponds approximately to the outer diameter d of the first connection stub 4. In order to ensure a fixed sealing of the first hose 34, the inner diameter g can also be somewhat smaller than the outer diameter d of the first connection stub 4. The outer diameter at the free end 15 of the connection stub 4 is smaller than the inner diameter g of the first hose 34, so that the first hose 34 can be pressed onto the bevel 9 of the first connection stub 4, and as the hose is pressed further onto the connection stub, it is widened by the bevel 9, thus enabling an easy pressing of the first hose 34 onto the first connection stub 4.

Pressed onto the second connection stub 5 is a hose 35, the inner diameter h of which corresponds approximately to the outer diameter a of the second connection stub 5. In order to ensure a good fixation of the second hose 35, the inner diameter h can also be somewhat smaller than the outer diameter a. The inner diameter h of the second hose 35 is larger than the second outer diameter c at the cylindrical portion 14, and is larger than the outer diameter b at that end of the bevel 11 that faces the cylindrical portion 14 (see FIG. 5). Thus, the second hose 35 can be pressed onto the second connection stub 5 up to the bevel 11. The second hose 35 is then widened by the bevel 11, so that it can be easily pressed up to the second connection stub 5.

FIG. 7 shows the placement of a first hose 34 onto the second connection stub 5. The inner diameter g of the first hose 34 corresponds approximately to the outer diameter c of the cylindrical portion 14. Thus, the first hose 34 can be pressed onto the cylindrical portion 14. The cylindrical portion 14 can also have an outer diameter that is smaller than the inner diameter g of the first hose 34. The cylindrical portion 14 can also have a larger outer diameter than the inner diameter g of the first hose 34. Despite its smaller inner diameter g, by placing the first hose 34 at an angle it can be forced onto the cylindrical portion 14. However, the inner diameter g of the first hose 34 is smaller than the second outer diameter b at that side of the bevel 11 that faces the free end 16. Therefore, the hose 34 can be pressed onto the second connection step 5 only up to the wall 29 of the shoulder 13. Since the wall 29 extends approximately perpendicular to the longitudinal central axis 30 of the second connection stub 5, the hose 34 is not widened, but rather rests against the shoulder 13. Due to the guidance along the cylindrical portion 14, the hose 34 cannot be placed at an angle. Therefore, it is not possible to mount the first hose 34 on the second connection stub 5. This reliably prevents an erroneous mounting.

The specification incorporates by reference the disclosure of German priority document 20 2004 016 374.8 filed Oct. 22, 2004

The present invention is, of course, in no way restricted to the specific disclosure of the specification and drawings, but also encompasses any modifications within the scope of the appended claims.

What we claim is:

1. A connector in combination with a first hose and a second hose, comprising:
    a first connection stub having a first free end for receiving said first hose; and
    a second connection stub having a second free end for receiving said second hose, wherein said first hose has an inner diameter that is smaller than an inner diameter of said second hose, wherein said second connection stub is provided with a shoulder at which, in a direction toward said second free end, a diameter of said second connection stub, decreases from a first outer diameter to a second outer diameter, wherein said first outer diameter is larger than said inner diameter of said first hose, and wherein said shoulder is formed by a wall that extends approximately perpendicular to a longitudinal central axis of said second connection stub, so that said first hose is capable of being pressed onto said second connection stub from said second free end up to said shoulder, where said first hose is adapted to abut against said shoulder, and said second hose is capable of being pressed over said shoulder onto said second connection stub, and wherein a cylindrical portion is disposed on said second connection stub and extends all the way from said shoulder to said second free end of said second connection stub.

2. A connector according to claim 1, wherein said second outer diameter of said shoulder is smaller than or approximately the same as said inner diameter of said first hose, and wherein an outer diameter of said first connection stub is larger than or the same as said second outer diameter and smaller than said first outer diameter.

3. A connector according to claim 1, wherein at least one connection stub is provided with a bevel on a free end thereof.

4. A connector according to claim 1, wherein a bevel is formed on said second connection stub on a side of said shoulder that faces away from said second free end.

5. A connector according to claim 1, further comprising a base plate on which said first and second connection stubs are disposed, wherein a mounting element is disposed on said base plate for a mounting of said connector in an opening, and wherein said mounting element is provided with an engagement element.

6. A connector according to claim 1, wherein at least one of said connection stubs is provided with a conical portion and wherein a diameter of said conical portion decreases in a direction toward said first or second free end of said connection stub.

7. A connector according to claim 1, wherein said connector is a monolithic component and is made of polymeric material.

* * * * *